Patented Sept. 19, 1950

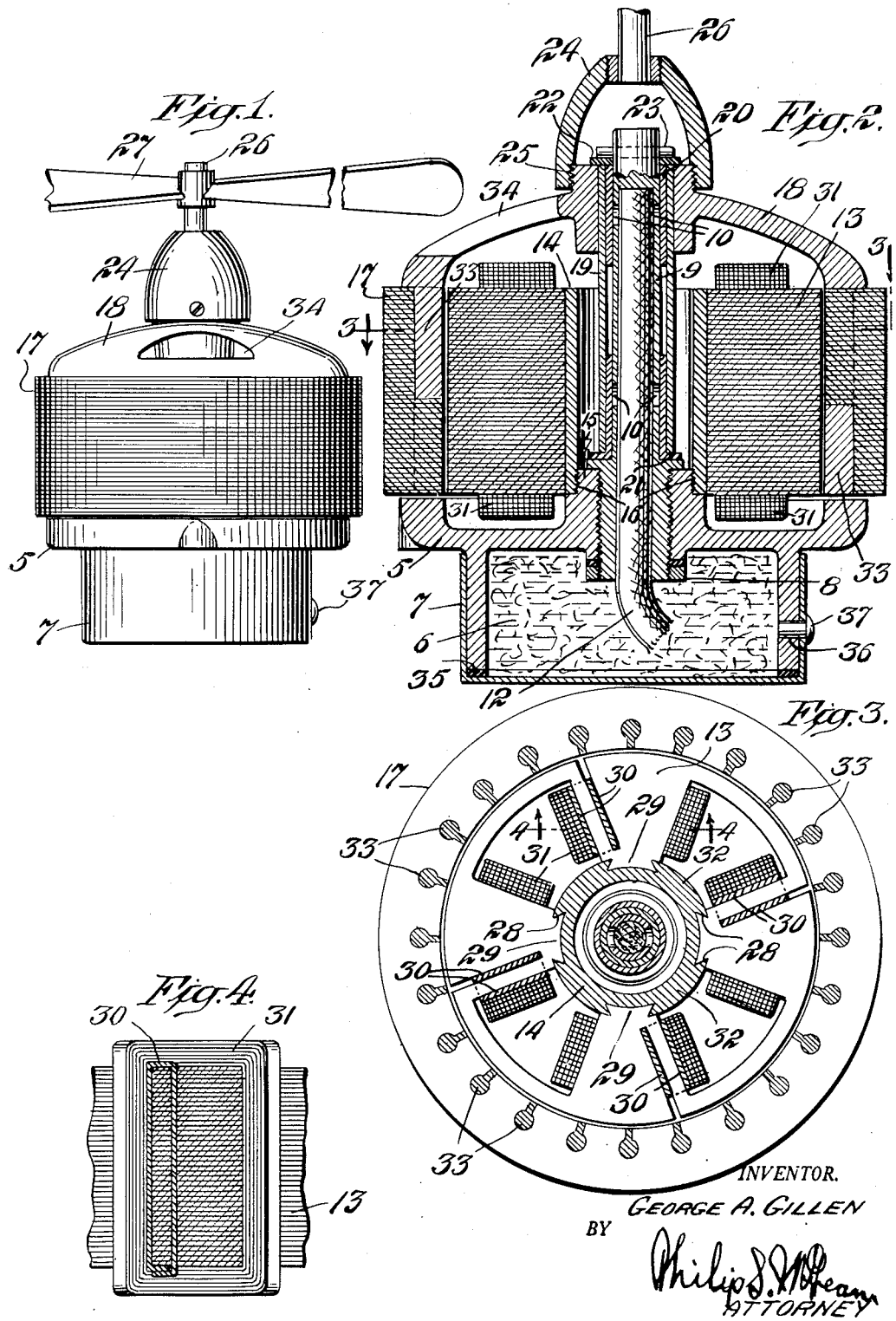

2,522,941

UNITED STATES PATENT OFFICE 2,522,941

ELECTRIC MOTOR

George A. Gillen, New York, N. Y.

Application September 17, 1948, Serial No. 49,674

4 Claims. (Cl. 172—36)

The invention herein disclosed relates to electric motors, particularly though not exclusively, to those of the induction, squirrel cage rotor type on the order of those covered in copending application for patent, Serial No. 47,669, filed September 3, 1948, now Patent No. 2,501,814.

Objects of the present invention are to provide a self-lubricating motor construction of high starting torque characteristics, of simple, inexpensive, readily assembled construction and having good ventilating and cooling qualities.

Special objects of the invention also are to provide such a motor in which the parts will all be of simple, sturdy and readily machined characteristics.

Other desirable objects and the novel features of construction, combination and relation of parts through which the purposes of the invention are attained are set forth or will appear in the course of the following specification.

The drawing accompanying and forming part of the specification illustrates a present practical embodiment of the invention. Structure, however, may be modified and changed as regards the immediate illustration, all within the true intent and broad scope of the invention as hereinafter defined and claimed.

Fig. 1 in the drawing is a side elevation of one of the motors, parts indicated as broken away;

Fig. 2 is an enlarged and broken vertical sectional view of the motor;

Fig. 3 is a horizontal sectional view on substantially the plane of line 3—3 of Fig. 2;

Fig. 4 is a further enlarged broken fragmentary detail as on substantially the plane of line 4—4 of Fig. 3.

The base of the motor, indicated generally at 5, is shown as having a cylindrical chamber 6 therein closed by a bottom cap 7 to form a container for wick material and lubricant.

A tubular shaft 9 is shown fixedly secured on the base by a nut 8, the walls of this tubular support shown as having side openings 10 in the top and bottom portions of the same for passage of lubricant fed by a wick 12 extending from the chamber 6 to the closed end portion of the shaft.

Stator laminations 13 are shown carried by a sleeve 14, surrounding but clear of the stationary central shaft and screwed in fixed relation on the central hub portion 15 of the base at 16.

The rotor is shown as made up of ring laminations 17 surrounding the stator and carried by a spider 18 having a sleeve 19 with flanged bearing bushings 20, 21, set in the opposite ends of the same and journaled on the fixed tubular mounting shaft 9.

The rotor is shown secured in its rotatable relation on the supporting shaft by thrust washer 22 and overstanding transverse pin 23 driven through the solid end portion of the shaft.

A conical cap 24 is shown screwed over the end of the rotor spider at 25 covering the rotor securing means and carrying a shaft 26 for driving a fan 27, Fig. 1, gear, pulley or other drive element.

The ring or hub 14 which carries the stator elements 13 may be of sintered powder construction and it is shown in Fig. 3 as having undercut dovetail grooves 28 receiving correspondingly shaped dovetail extensions 29 on the inner periphery of the stator laminations. This construction allows for assembly of the shading coils 30 and the energizing coils 31 on the polar laminations, and also provides integral shunt plate formations 32 between adjoining polar tips.

The squirrel cage inductor bars 33 may be set in the usual inclined relation in corresponding slots in the rotor laminations at the inner periphery of the rotor, and these may be cast, molded or otherwise formed as integral extensions of the end cap or spider 18.

The spider or lamination supporting core portion 18 of the rotor may have ventilating openings 34 in the top of the same for keeping the windings and other portions cool and in proper working condition.

The flanged cover or closure 7 for the lubricant chamber may be secured by a forced fit engagement over the hollow base chamber 6, with a sealing gasket 35, Fig. 2.

While ordinarily the chamber in the hollow base at 6 may hold sufficient lubrication for the life of the motor, it is contemplated that a filling opening 36 may be provided in the side of the chamber sealed by a removable rubber plug 37 or the like, to enable additional or different lubricant to be supplied if that be considered necessary or desirable.

The construction provides a simple, powerful form of motor which can be made up and assembled at relatively low cost and which will be self-lubricating for its useful life, or may be specially or further lubricated at any time if that be found desirable.

What is claimed is:

1. An electric motor comprising a base having a lubricant chamber and a vertical stationary tubular shaft extending upwardly from said lubricant chamber, a stator mounted on the base about the projecting portion of said stationary shaft and a rotor journaled on said vertical shaft about said stator, said stationary tubular shaft having means for conducting lubricant from the lubricating chamber upwardly to said rotor, means engaged with the upper end of said shaft for securing the rotor journaled thereon and a cap secured to the rotor over the top of said securing means and carrying a driving element.

2. An electric motor comprising a base having a lubricant chamber and a vertical stationary tubular shaft extending upwardly from said lubricant chamber, a stator mounted on the base about the projecting portion of said stationary shaft and a rotor journaled on said vertical shaft about said stator, said stationary tubular shaft having means for conducting lubricant from the lubricating chamber upwardly to said rotor, means engaged with the upper end of said shaft for securing the rotor journaled thereon and a cap secured to the rotor over the top of said securing means and carrying a driving element, said cap having a removable connection with the rotor for exposing said securing means.

3. An electric motor comprising a base having a lubricant chamber and a stationary tubular shaft extending from said lubricant chamber, a stator mounted on the base about the projecting portion of said stationary shaft and a rotor journaled on said shaft about said stator, said stationary tubular shaft having means for conducting lubricant from the lubricating chamber to said rotor, said stator including a ring spaced from the central supporting shaft and having dovetail grooves receiving corresponding dovetail portions at the inner ends of polar extensions on the laminations and shunt plate portions between the dovetail grooves connecting adjoining poles of the stator laminations.

4. An electric motor comprising a base having a lubricant chamber and a stationary tubular shaft extending from said lubricant chamber, a stator mounted on the base about the projecting portion of said stationary shaft and a rotor journaled on said shaft about said stator, said stationary tubular shaft having means for conducting lubricant from the lubricating chamber to said rotor, said stator including a ring spaced from the central supporting shaft and having dovetail grooves receiving corresponding dovetail portions at the inner ends of polar extensions on the laminations and shunt plate portions between the dovetail grooves conncting adjoining poles of the stator laminations and coils on the polar projections of the stator held in place by said ring and said ring having a removable screw engagement over a central hub portion of the base about the fixed supporting shaft.

GEORGE A. GILLEN.

REFERENCES CITED

The following references are of record in the file of this patent:

UNITED STATES PATENTS

| Number | Name | Date |
|---|---|---|
| 945,365 | Berg | Jan. 4, 1910 |
| 1,747,560 | Weathers | Feb. 18, 1930 |
| 2,048,421 | Ballentine | July 21, 1936 |
| 2,067,155 | Levy et al. | Jan. 5, 1937 |